(12) United States Patent
Wu (10) Patent No.: US 11,525,496 B2
(45) Date of Patent: Dec. 13, 2022

(54) ROLLER CHAIN

(71) Applicant: A Man Power Transmission Co., Ltd., Tainan (TW)

(72) Inventor: Hou-Te Wu, Tainan (TW)

(73) Assignee: A MAN POWER TRANSMISSION CO., LTD., Tainan (TW)

( * ) Notice: Subject to any disclaimer, the term of this patent is extended or adjusted under 35 U.S.C. 154(b) by 316 days.

(21) Appl. No.: 16/917,324

(22) Filed: Jun. 30, 2020

(65) Prior Publication Data

US 2021/0018065 A1     Jan. 21, 2021

(30) Foreign Application Priority Data

Jul. 17, 2019  (TW) .................................. 108209342

(51) Int. Cl.
    *F16G 13/06*     (2006.01)

(52) U.S. Cl.
    CPC .................................... *F16G 13/06* (2013.01)

(58) Field of Classification Search
    CPC ...................................................... F16G 13/06
    USPC ....................................................... 474/230
    See application file for complete search history.

(56) References Cited

U.S. PATENT DOCUMENTS

2008/0061512 A1   3/2008  Yamane et al.
2008/0287237 A1*  11/2008 Aoki ....................... F16G 13/06
                                                          474/228
2010/0081528 A1   4/2010  Yamane et al.
2010/0285912 A1* 11/2010 Aoki ....................... F16G 13/06
                                                          474/228
2017/0211660 A1*  7/2017  Yasu ...................... F16G 15/06

FOREIGN PATENT DOCUMENTS

DE     102017107870 A1 * 10/2018 ............. F16G 13/06
EP         2837857 A1 *  2/2015 ............. F16G 13/06
JP         2008164043 A    7/2008
WO     WO-2017080315 A1 *  5/2017

OTHER PUBLICATIONS

Search Report, which was issued to European counterpart Application No. 20183270.6 by the EPO dated Dec. 4, 2020.

* cited by examiner

*Primary Examiner* — Gene O Crawford
*Assistant Examiner* — Emily R Kincaid
(74) *Attorney, Agent, or Firm* — Kirton McConkie; Evan R. Witt (57) ABSTRACT

A roller chain includes a plurality of inner and outer link units and a plurality of sealing rings. Each inner link unit includes two inner chain plates and two bushings. Each outer link unit interconnects an adjacent pair of the inner link units, and includes two outer chain plates and two connecting rods. Each of the outer chain plates has two inner surrounding surface portions each partially defining a retaining space. Each of the sealing rings is disposed in a respective one of the retaining spaces in the outer chain plates.

5 Claims, 6 Drawing Sheets

ROLLER CHAIN

CROSS-REFERENCE TO RELATED APPLICATION

This application claims priority of Taiwanese Utility Model Patent Application No. 108209342, filed on Jul. 17, 2019.

FIELD

The disclosure relates to a roller chain, and more particularly to a roller chain with oil sealing rings.

BACKGROUND

Figure 1:
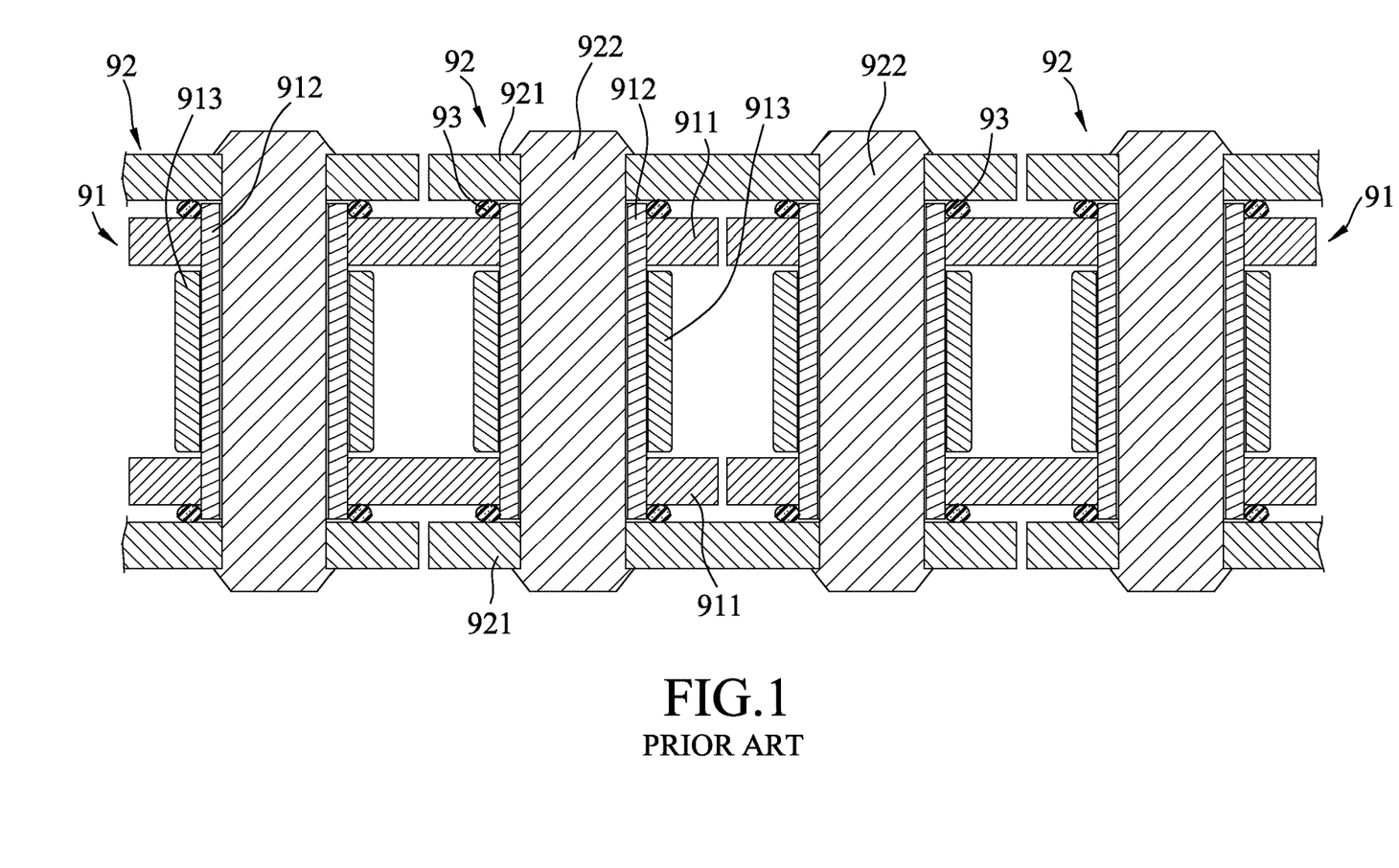
FIG. 1 is a fragmentary sectional view illustrating a conventional roller chain.

Referring to FIG. 1, a conventional roller chain includes a plurality of spaced-apart inner link units 91, a plurality of outer link units 92 each interconnecting two adjacent ones of the inner link units 91, and a plurality of oil sealing rings 93. Each of the inner link units 91 includes two spaced-apart inner chain plates 911, two bushings 912 each interconnecting the inner chain plates 911, and two rollers 913 respectively mounted to the bushings 912. Each of the outer link units 92 includes two outer chain plates 921 respectively disposed at two opposite sides of the corresponding two inner link units 91, and two connecting rods 922 each interconnecting the outer chain plates 921 and extending through a bushing 912 of one of the corresponding two inner link units 91. Each of the oil sealing rings 93 is sleeved on a bushing 912, and is tightly fitted between a corresponding outer chain plate 921 and a corresponding inner chain plate 911 for preventing leakage of a lubricant added between the bushing 912 and a corresponding connecting rod 922. Each of the oil sealing rings 93 is compressed by the corresponding outer and inner chain plates 921, 911 such that the thickness of the compressed oil sealing ring 93 is smaller than three-quarters the original thickness of the oil sealing ring 93.

When the conventional roller chain is in operation, the inner and outer link units 91, 92 rotate relative to each other, such that each bushing 912 and the corresponding connecting rod 922 rotate relative to each other, and that the lubricant serves to lower friction and abrasion between the bushing 912 and the corresponding connecting rod 922. Each of the oil sealing rings 93 serves to alleviate leakage of the lubricant.

However, when the inner and outer link units 91, 92 rotate relative to each other, each of the oil sealing rings 93 that is tightly fitted between the corresponding outer and inner chain plates 921, 911 is forced to frictionally move relative the corresponding outer and inner chain plates 921, 911. As such, the transmission of mechanical force is inefficient, and the oil sealing rings 93 may be worn easily.

SUMMARY

Therefore, an object of the disclosure is to provide a roller chain that can alleviate at least one of the drawbacks of the prior art.

According to the disclosure, the roller chain includes a plurality of spaced-apart inner link units, a plurality of outer link units and a plurality of sealing rings. Each of the inner link units includes two spaced-apart inner chain plates each of which has an outer surface facing away from the other one of the inner chain plates, and two parallel bushings each of which interconnects the inner chain plates. Each of the outer link units interconnects an adjacent pair of the inner link units, and includes two spaced-apart outer chain plates that are respectively disposed at two opposite sides of the inner link units, and two parallel connecting rods each of which interconnects the outer chain plates and rotatably extends through one of the bushings of a respective one of the adjacent pair of the inner link units. For each of the outer link units, each of the outer chain plates has an inner surface that faces the other one of the outer chain plates. The inner surface of each of the outer chain plates has an inner base surface portion that is proximate to the inner chain plates of the corresponding pair of the inner link units, two spaced-apart inner bottom surface portions that are distal from the inner chain plates of the corresponding pair of the inner link units, and two inner surrounding surface portions. Each of the inner surrounding surface portions is connected to the inner base surface portion and a respective one of the inner bottom surface portions, and cooperates with the respective one of the inner bottom surface portions, a corresponding connecting rod and a corresponding bushing to define an annular retaining space. Each of the sealing rings is disposed in a respective one of the retaining spaces in the outer chain plates.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
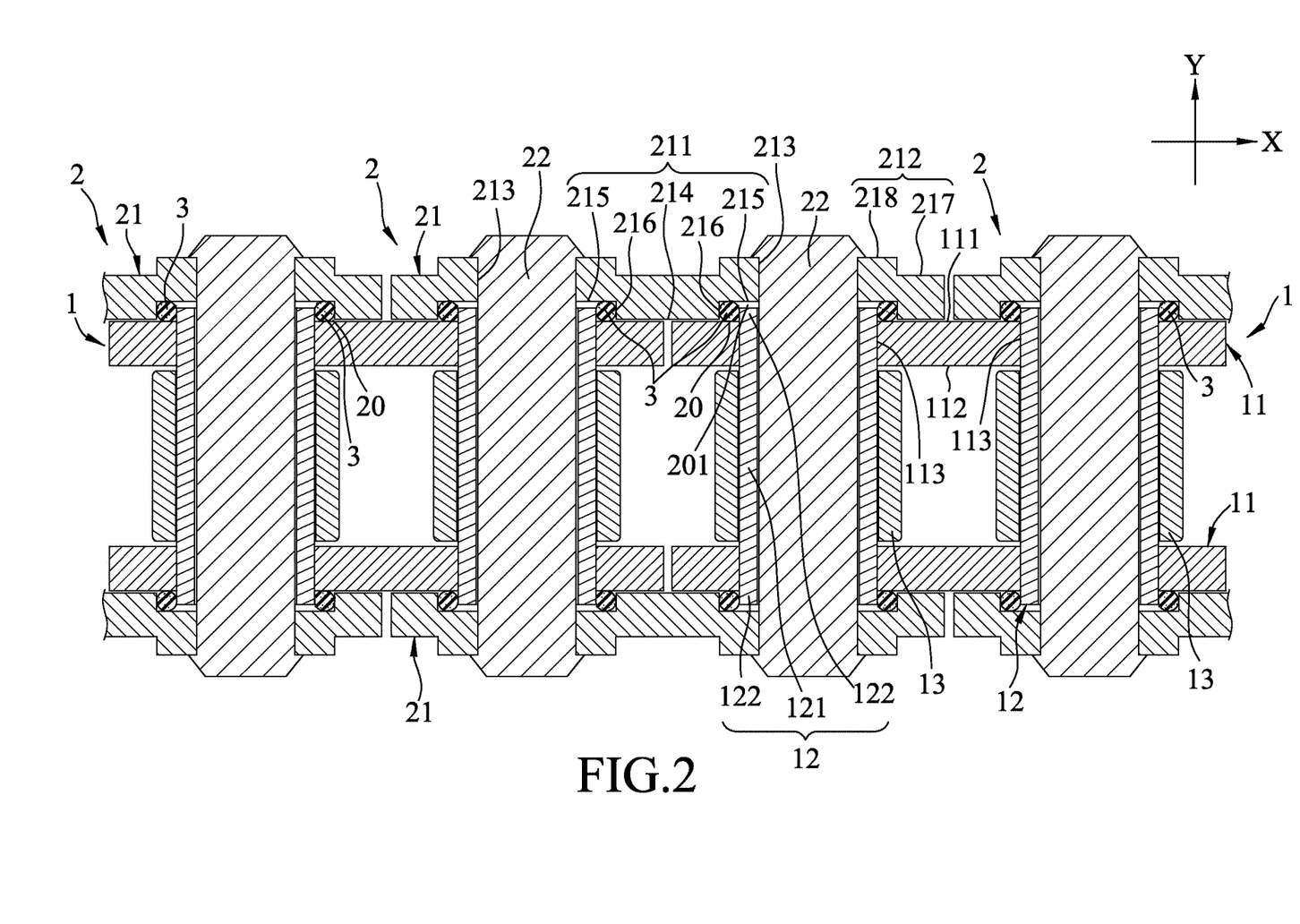
FIG. 2 is a fragmentary sectional view illustrating a first embodiment of the roller chain according to the disclosure.
Figure 3:
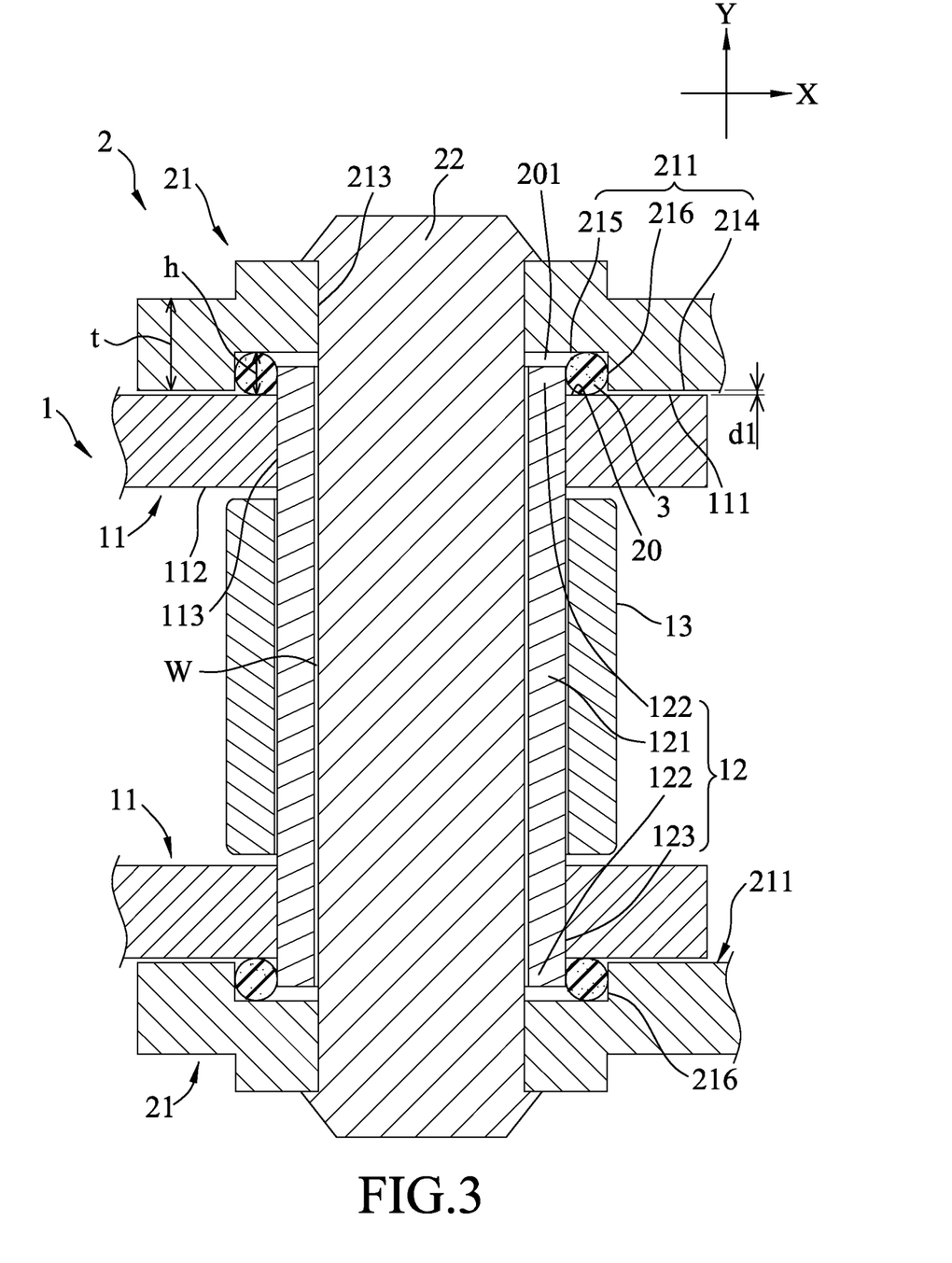
FIG. 3 is an enlarged view of a portion of FIG. 2.
Figure 4:
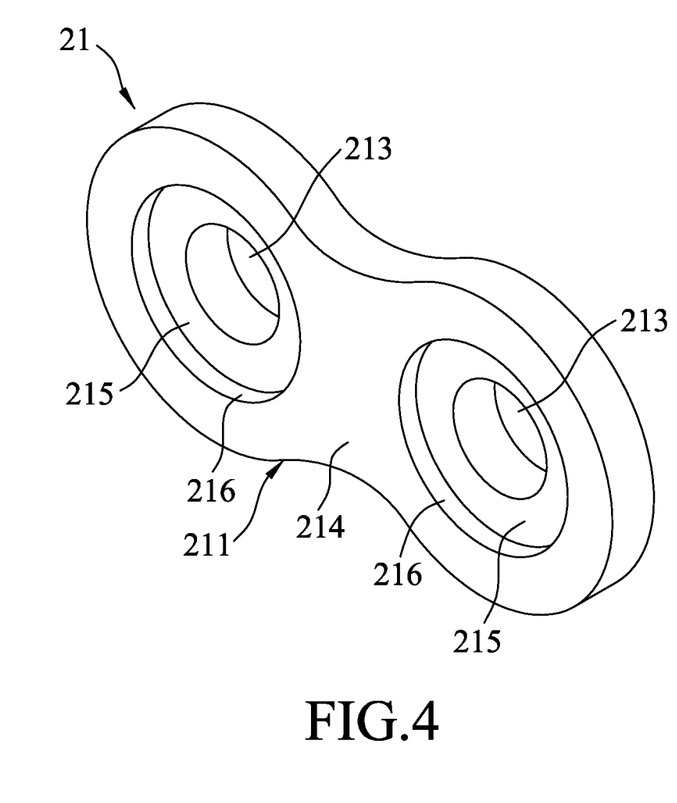
FIG. 4 is a perspective view illustrating an outer chain plate of the first embodiment.

Referring to FIGS. 2 to 4, the first embodiment of the roller chain according to the disclosure includes a plurality of inner link units 1 that are spaced apart in a first direction (X), a plurality of outer link units 2, and a plurality of sealing rings 3.

Each of the inner link units 1 includes two inner chain plates 11 that are spaced apart from each other in a second direction (Y) perpendicular to the first direction (X), two spaced-apart and parallel bushings 12 each of which extends in the second direction (Y) and interconnects the inner chain plates 11, and two roller members 13 that are disposed between the inner chain plates 11 and that are respectively mounted on the bushings 12.

For each inner link unit 1, each of the inner chain plates 11 has an outer surface 111 that faces away from the other inner chain plate 11, an inner surface 112 that faces the other inner chain plate 11, and two through holes 113 that are spaced apart in the first direction (X) and that extend through the outer surface 111 and the inner surface 112. Each of the bushings 12 has a main portion 121 that has two opposite ends each being press-fitted into a through hole 113 of a respective one of the inner chain plates 11, and two protruding portions 122 that respectively extend from the opposite end of the main portion 121 and that respectively protrude from the outer surfaces 111 of the inner chain plates 11. In one embodiment, each of the inner chain plates 11 is configured as a thin plate, and each of the bushings 12 is configured as a short tube.

Each of the outer link units 2 interconnects an adjacent pair of the inner link units 1, and includes two outer chain plates 21 that are spaced apart from each other in the second direction (Y) and that are respectively disposed at two opposite sides of the inner link units 1 in the second direction (Y), and two spaced-apart and parallel connecting rods 22 each of which interconnects the outer chain plates 21 and rotatably extends through one of the bushings 12 of a respective one of the adjacent pair of the inner link units 1.

Figure 5:
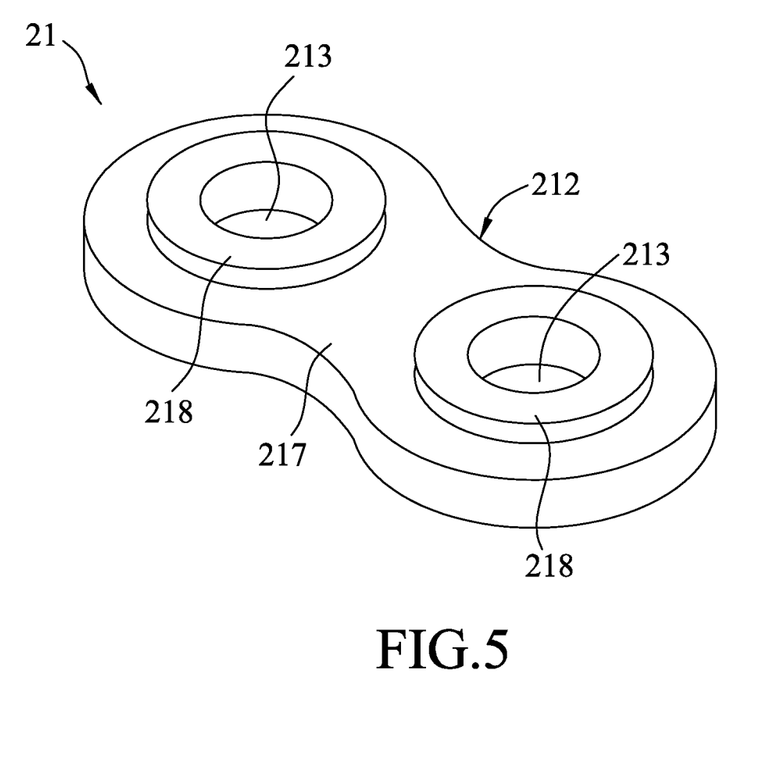
FIG. 5 is another perspective view illustrating the outer chain plate.

Referring further to FIG. 5, for each of the outer link units 2, each of the outer chain plates 21 has an inner surface 211 that faces the other outer chain plate 21, an outer surface 212 that faces away from the other outer chain plate 21, and two through holes 213 that are spaced apart in the first direction (X) and that extend through the inner surface 211 and the outer surface 212.

The inner surface 211 of each of the outer chain plates 21 has an inner base surface portion 214 that extends in the first direction (X) and that is proximate to the inner chain plates 11 of the corresponding pair of the inner link units 1, two spaced-apart inner bottom surface portions 215 that are distal from and parallel to the inner chain plates 11 of the corresponding pair of the inner link units 1, and two inner surrounding surface portions 216. Each of the inner bottom surface portions 215 surrounds a respective one of the through holes 213 of the outer chain plate 21, and is spaced apart from a protruding portion 122 of a corresponding one of the bushings 12. Each of the inner surrounding surface portions 216 is connected to the inner base surface portion 214 and a respective one of the inner bottom surface portions 215, and surrounds a respective one of the through holes 213 of the outer chain plate 21. Each of the inner surrounding surface portions 216 extends in the second direction (Y) and cooperates with the respective one of the inner bottom surface portions 215, a corresponding one of the connecting rods 22 and the corresponding one of the bushings 12 to define an annular retaining space 20, such that each outer chain plate 21 has two retaining spaces 20.

The outer surface 212 of each of the outer chain plates 21 has an outer base surface portion 217, and two outer protruding surface portions 218 that protrude relative to the outer base surface portion 217 and that respectively correspond in position to the retaining spaces 20 in the outer chain plate 21, such that the profiles of the outer surface 212 and the inner surface 211 of each of the outer chain plates 21 complement each other.

Each of the sealing rings 3 is made of silicone or rubber, and is disposed in a respective one of the retaining spaces 20 in the outer chain plates 21 in such a manner that: radially-outer and radially-inner edges of the sealing ring 3 respectively abut against a corresponding one of the inner surrounding surface portions 216 and the protruding portion 122 of the corresponding bushing 12; and two axially-opposite ends of the sealing ring 3 in the second direction (Y) respectively abut against a corresponding one of the inner bottom surface portions 215 and the outer surface 111 of a corresponding one of the inner chain plates 11. Each of the sealing rings 3 is slightly compressed by the corresponding inner surrounding surface portion 216 and the protruding portion 122 of the corresponding bushing 12 in the radial direction, and is slightly compressed by the corresponding inner bottom surface portion 215 and the outer surface 111 of the corresponding inner chain plate 11 in the axial direction. In one embodiment, each of the sealing rings 3 has a circular cross-section.

In detail, an original axial thickness (i.e., uncompressed axial thickness) of the sealing ring 3 in the second direction (Y) is 45% to 65% the thickness (t, see FIG. 3) of the outer chain plate 21. A distance (dl, see FIG. 3) between the inner base surface portion 214 of an outer chain plate 21 and the outer surface 111 of an adjacent inner chain plate 11 is greater than 0 millimeter and less than 0.2 millimeters. In one embodiment, the original axial thickness of each of the sealing rings 3 is 1.0 millimeter, and the distance (dl) between the inner base surface portion 214 of an outer chain plate 21 and the outer surface 111 of a corresponding inner chain plate 11 is 0.1 millimeters. When a sealing ring 3 is compressed by the corresponding inner bottom surface portion 215 and the outer surface 111 of the corresponding inner chain plate 11, the compressed axial thickness (h, see FIG. 3) is 90% to 95% the original axial thickness thereof.

Each of the retaining spaces 20 has a lubricant reservoir 201 that is defined among the corresponding sealing ring 3, the protruding portion 122 of the corresponding bushing 12, the corresponding inner bottom surface portion 215 and the corresponding connecting rod 22 for reserving a lubricant. The lubricant in each lubricant reservoir 201 can be further prevented from leakage by virtue of the corresponding inner surrounding surface portion 216 that abuts against the corresponding sealing ring 3.

Each of the connecting rods 22 has two opposite ends each of which is press-fitted into a through hole 213 of the corresponding outer chain plate 21.

In use, the roller chain meshes with a plurality of sprockets (not shown) for transmitting mechanism power, and the lubricant is added into gaps (W, only one is shown in FIG. 3) between each connecting rod 22 and the corresponding bushing 12 to smoothen the relative rotation between the inner and outer link units 1, 2.

In summary, by virtue of the inner surrounding surface portions 216, the radial deformation of each of the sealing rings 3 limited by the corresponding inner surrounding surface portion 216 and the protruding portion 122 of the corresponding bushing 12, and the axial deformation of each of the sealing rings 3 is simultaneously limited by the corresponding inner bottom surface portion 215 and the outer surface 111 of the corresponding inner chain plate 11. Therefore, each of the sealing rings 3 is merely required to be slightly compressed for preventing leakage of the lubricant. As a result, the friction between each sealing ring 3 and the corresponding inner chain plate 11 and between each sealing ring 3 and the corresponding outer chain plate 21 is considerably reduced, which in turn improves efficiency of transmission of mechanical force the service life of the roller chain. Moreover, since the distance (dl) between the inner base surface portion 214 of one of the outer chain plates 21 and the outer surface 111 of the corresponding one of the inner chain plates 11 is relatively small, dust and debris may not enter a space between an outer chain plate 21 and a corresponding inner chain plate 11.

Figure 6:
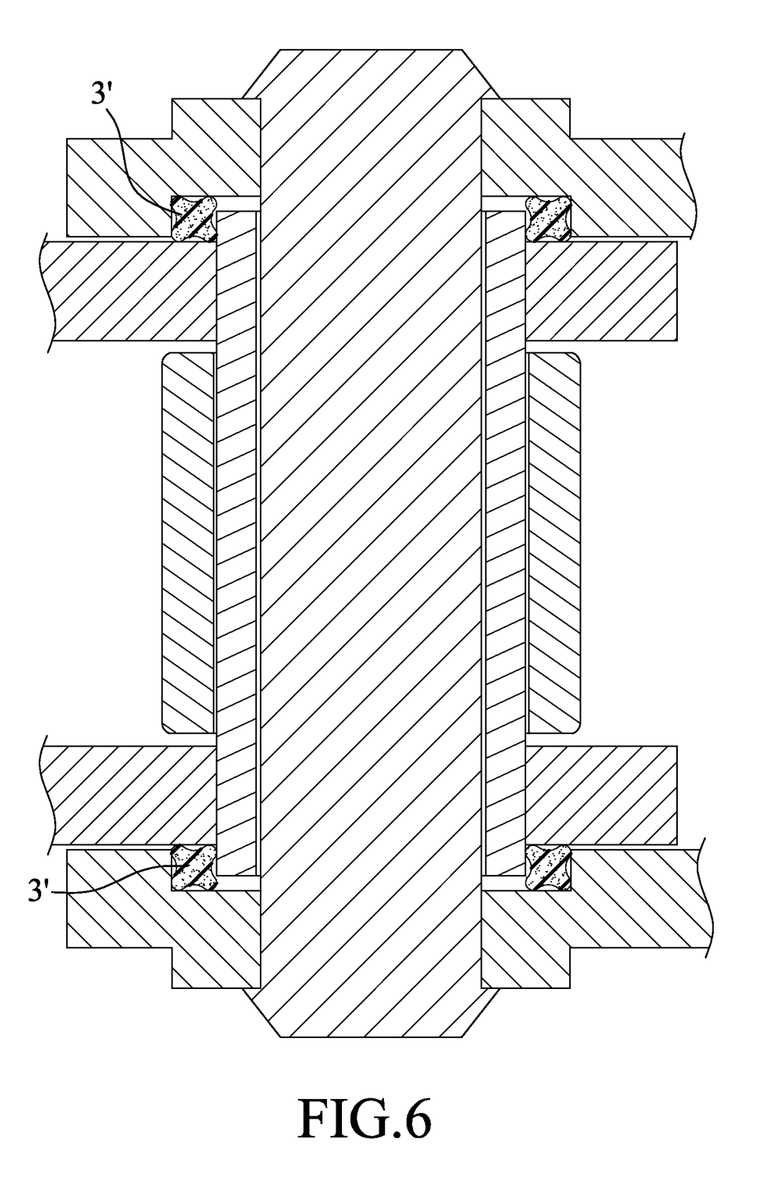
FIG. 6 is a fragmentary sectional view illustrating a second embodiment of the roller chain according to the disclosure.

Referring to FIG. 6, the second embodiment of the roller chain according to the disclosure is similar to the first embodiment. The difference between the first and second embodiments is that each of the sealing ring 3' has an x-shaped cross-section.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A roller chain comprising:
a plurality of spaced-apart inner link units, each of said inner link units including two spaced-apart inner chain plates each of which has an outer surface facing away from the other one of said inner chain plates, and two parallel bushings each of which interconnects said inner chain plates;
a plurality of outer link units, each of said outer link units interconnecting an adjacent pair of said inner link units, and including two spaced-apart outer chain plates that are respectively disposed at two opposite sides of said inner link units, and two parallel connecting rods each of which interconnects said outer chain plates and rotatably extends through one of said bushings of a respective one of the adjacent pair of said inner link units, for each of said outer link units, each of said outer chain plates having an inner surface that faces the other one of said outer chain plates, said inner surface of each of said outer chain plates having an inner base surface portion that is proximate to said inner chain plates of the corresponding pair of said inner link units, two spaced-apart inner bottom surface portions that are distal from said inner chain plates of the corresponding pair of said inner link units, and two inner surrounding surface portions, each of said inner surrounding surface portions being connected to said inner base surface portion and a respective one of said inner bottom surface portions, and cooperating with the respective one of said inner bottom surface portions, a corresponding connecting rod and a corresponding bushing to define an annular retaining space; and
a plurality of sealing rings, each of said sealing rings being disposed in a respective one of said retaining spaces in said outer chain plates;
wherein for each of said inner link units, each of said bushings has a main portion, and two protruding portions that respectively extend from two opposite ends of said main portion and that respectively protrude from said outer surfaces of said inner chain plates, each of said protruding portions partially defining a respective one of said retaining spaces, and being spaced apart from a corresponding one of said inner bottom surface portions of said pouter chain plates, and
wherein each of said sealing rings is axially compressed by said inner surface of a corresponding one of said outer chain plates and said outer surface of a corresponding one of said inner chain plates, a compressed axial thickness of each of said sealing rings being 90% to 95% the uncompressed axial thickness of said sealing ring.

2. A roller chain comprising:
a plurality of spaced-apart inner link units, each of said inner link units including two spaced-apart inner chain plates each of which has an outer surface facing away from the other one of said inner chain plates, and two parallel bushings each of which interconnects said inner chain plates;
a plurality of outer link units, each of said outer link units interconnecting an adjacent pair of said inner link units, and including two spaced-apart outer chain plates that are respectively disposed at two opposite sides of said inner link units, and two parallel connecting rods each of which interconnects said outer chain plates and rotatably extends through one of said bushings of a respective one of the adjacent pair of said inner link units, for each of said outer link units, each of said outer chain plates having an inner surface that faces the other one of said outer chain plates, said inner surface of each of said outer chain plates having an inner base surface portion that is proximate to said inner chain plates of the corresponding pair of said inner link units, two spaced-apart inner bottom surface portions that are distal from said inner chain plates of the corresponding pair of said inner link units, and two inner surrounding surface portions, each of said inner surrounding surface portions being connected to said inner base surface portion and a respective one of said inner bottom surface portions, and cooperating with the respective one of said inner bottom surface portions, a corresponding connecting rod and a corresponding bushing to define an annular retaining space; and
a plurality of sealing rings, each of said sealing rings being disposed in a respective one of said retaining spaces in said outer chain plates;
wherein for each of said inner link units, each of said bushings has a main portion, and two protruding portions that respectively extend from two opposite ends of said main portion and that respectively protrude from said outer surfaces of said inner chain plates, each of said protruding portions partially defining a respective one of said retaining spaces, and being spaced apart from a corresponding one of said inner bottom surface portions of said pouter chain plates, and
wherein an original axial thickness of each of said sealing rings is 45% to 65% the thickness of each of said outer chain plates.

3. The roller chain as claimed in claim 1, wherein a distance between said inner base surface portion of an outer chain plate and said outer surface of an adjacent inner chain plate is greater than 0 millimeter and less than 0.2 millimeters.

4. The roller chain as claimed in claim 1, wherein, for each of said outer link units, each of said outer chain plates further has an outer surface that faces away from the other one of said outer chain plates, said outer surface of each of said outer chain plates having an outer base surface portion, and two outer protruding surface portions that protrude relative to said outer base surface portion and that respectively correspond in position to said retaining spaces in said outer chain plate.

5. The roller chain as claimed in claim 4, wherein each of said retaining spaces has a lubricant reservoir that is defined among a corresponding sealing ring, a protruding portion of a corresponding bushing, a corresponding inner bottom surface portion and a corresponding connecting rod for reserving a lubricant.

\* \* \* \* \*